(12) United States Patent
Dolfi et al.

(10) Patent No.: US 7,567,341 B2
(45) Date of Patent: Jul. 28, 2009

(54) OPTICAL NAVIGATION DEVICE ADAPTED FOR NAVIGATION ON A TRANSPARENT STRUCTURE

(75) Inventors: David W. Dolfi, Los Altos, CA (US); Ramakrishna Kakarala, Santa Clara, CA (US); Annette Claire Grot, Santa Clara, CA (US)

(73) Assignee: Avago Technologies ECBU IP (Singapore) Pte. ltd., Singapore (SG)

( * ) Notice: Subject to any disclaimer, the term of this patent is extended or adjusted under 35 U.S.C. 154(b) by 0 days.

(21) Appl. No.: 11/864,301

(22) Filed: Sep. 28, 2007

(65) Prior Publication Data

US 2008/0158540 A1 Jul. 3, 2008

Related U.S. Application Data

(63) Continuation-in-part of application No. 11/734,244, filed on Apr. 11, 2007, and a continuation-in-part of application No. 11/618,427, filed on Dec. 29, 2006.

(51) Int. Cl.
*G01P 3/36* (2006.01)
(52) U.S. Cl. .................................. 356/28; 701/223
(58) Field of Classification Search ....... 356/3.01–3.15, 356/4.01–4.1, 5.01–5.15, 6–22
See application file for complete search history.

(56) References Cited

U.S. PATENT DOCUMENTS

| | | | |
|---|---|---|---|
| 5,644,139 A | 7/1997 | Allen et al. | |
| 6,222,174 B1 | 4/2001 | Tullis et al. | |
| 6,281,882 B1 | 8/2001 | Gordon et al. | |
| 6,433,780 B1 | 8/2002 | Gordon | |
| 7,339,575 B2 | 3/2008 | Tai | |
| 2003/0193529 A1 | 10/2003 | Lee | |
| 2004/0189593 A1 | 9/2004 | Koay | |
| 2005/0060668 A9* | 3/2005 | Lee et al. | 715/856 |
| 2008/0061219 A1* | 3/2008 | Lee et al. | 250/221 |

FOREIGN PATENT DOCUMENTS

DE 69808522 8/2003

* cited by examiner

*Primary Examiner*—Thomas H Tarcza
*Assistant Examiner*—Luke D Ratcliffe (57) ABSTRACT

A technique for adapting an optical navigation device for navigation on a transparent structure such as a glass plate involves establishing a navigation window for navigation tracking, detecting reflected light within the navigation window, generating an output signal in response to the detected light, and adjusting a characteristic of the navigation window in response to the output signal. An optical navigation device includes an illumination system configured to output light, an image sensor configured to generate an output signal related to a detected portion of the light, and a transparent structure adapter module configured to adjust a navigation window of the image sensor in response to the output signal to adapt the optical navigation device for use directly on an opaque surface or for use on a transparent structure that is located between the optical navigation device and the opaque surface.

21 Claims, 8 Drawing Sheets

OPTICAL NAVIGATION DEVICE ADAPTED FOR NAVIGATION ON A TRANSPARENT STRUCTURE

CROSS-REFERENCE TO RELATED APPLICATIONS

This application is a continuation-in-part of application Ser. No. 11/618,427, filed Dec. 29, 2006 and application Ser. No. 11/734,244, filed Apr. 11, 2007, both of which are incorporated by reference herein.

BACKGROUND OF THE INVENTION

An optical navigation device, such as an optical mouse, typically includes a light source to illuminate a navigation surface and an image sensor that functions as a miniature digital camera to continually collect images of the illuminated navigation surface and to determine the speed and direction that the device is being moved across the surface by comparing sequentially recorded frames of image information. Image frames are collected at a very high rate and the resolution of the image sensor is high enough to detect very small movements of the device relative to the navigation surface.

When an optical mouse is used on most opaque surfaces, such as desktops, the collected image frames have enough features to determine relative movement between image frames. However, using an optical mouse on a transparent surface, such as a plate of glass that sits on a desktop, presents unique challenges. In particular, the top surface of the glass plate is typically so smooth that it provides few if any distinguishable features in the collected image frames and the thickness of the glass can change the geometry between the light source, the image sensor, and the underlying desktop such that an insufficient amount of light is reflected from the desktop to the image sensor.

An optical mouse could be designed for dedicated use on a desktop that is covered by a glass plate of known thickness. Although such an application-specific design is possible, it is not practical because an optical mouse may be used on both transparent and opaque surfaces over its lifetime and because the thickness of glass plates that cover desktops is difficult to predict and may change from plate to plate.

SUMMARY OF THE INVENTION

A technique for adapting an optical navigation device for navigation on a transparent structure such as a glass plate involves establishing a navigation window for navigation tracking, detecting reflected light within the navigation window, generating an output signal in response to the detected light, and adjusting a characteristic of the navigation window in response to the output signal. In an embodiment, a characteristic of the navigation window is adjusted to optimize the image sensor output for navigation tracking. For example, in the case where the amount of detected light that is reflected from the opaque surface is greater than the amount of detected light that is reflected from the top surface of the glass plate, a characteristic of the navigation window is adjusted to primarily detect light that is reflected from the opaque surface. Likewise, in the case where the amount of detected light that is reflected from the top surface of the glass plate is greater than the amount of detected light that is reflected from the opaque surface (e.g., because of the thickness of the glass plate), a characteristic of the navigation window is adjusted to primarily detect light that is reflected from the top surface of the glass plate. Adjusting the navigation window in response to the output signal enables the optical navigation device to adapt to operating conditions so that it can work effectively on an opaque surface and on transparent surfaces that have different thicknesses.

In an embodiment, a method for adapting an optical navigation device for navigation on a transparent structure where the transparent structure overlays an opaque surface involves establishing a navigation window, outputting light towards the transparent structure and the opaque surface, detecting reflected light within the navigation window, and adjusting a characteristic of the navigation window in response to the detected light to select whether the navigation window detects reflected light primarily from a surface of the transparent structure or primarily from the opaque surface.

In another embodiment, an optical navigation device includes an illumination system configured to output light, an image sensor configured to generate an output signal related to a detected portion of the light, and a transparent structure adaptor module configured to adjust a navigation window of the image sensor in response to the output signal to adapt the optical navigation device for use directly on an opaque surface or for use on a transparent structure that is located between the optical navigation device and the opaque surface.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
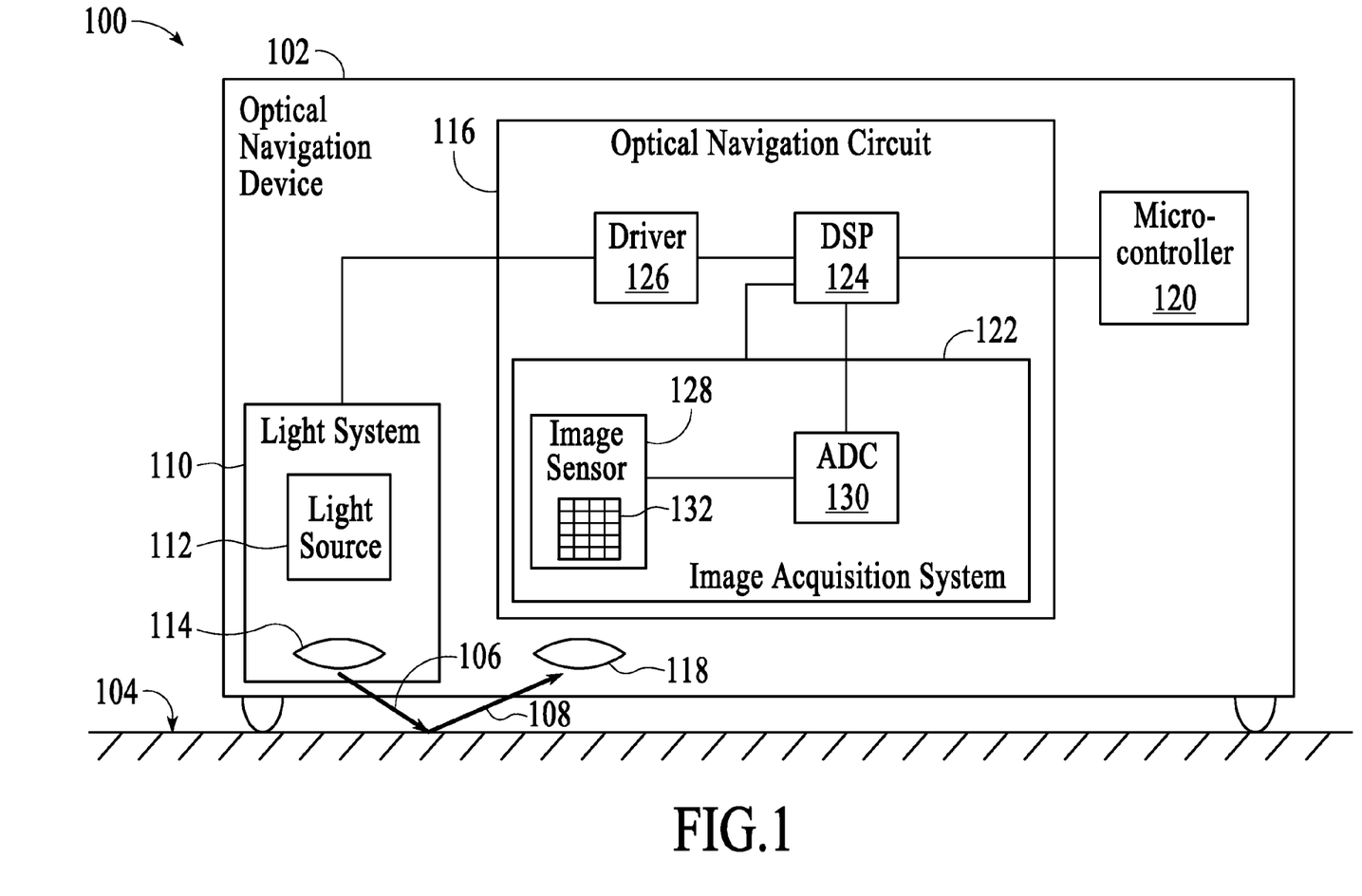
FIG. 1 depicts a schematic block diagram of one embodiment of an optical navigation system.

FIG. 1 depicts a schematic block diagram of one embodiment of an optical navigation system 100. The optical navigation system 100 includes an optical navigation device 102 and a navigation surface 104. The optical navigation device 102 emits a light beam 106 that is reflected by the navigation surface 104. The optical navigation device 102 detects a portion of the reflected light 108 and processes the detected light to generate movement information related to the movement of the optical navigation device relative to the navigation surface. As used herein, reflected light may be specular light and/or diffuse or scattered light depending upon the reflecting surface.

The optical navigation device 102 of FIG. 1 includes an illumination system 110 having a light source 112 and an optical element 114, an optical navigation circuit 116, an optical element 118, and a microcontroller 120. Other embodiments of the optical navigation device may include fewer or more components. In an embodiment, the optical elements 114 and 118 are lenses although other types and/or combinations of optical elements may be utilized. Lens 114 directs light to the navigation surface and lens 118 directs reflected light to the optical navigation circuit.

In an embodiment, the light source 112 of the illumination system 110 is a laser such as a vertical cavity surface emitting laser (VCSEL) and in another embodiment, the light source is a light emitting diode (LED). Alternatively, the light source may be another type of light source. The illumination system generates the beam of light 106 that is used to illuminate a spot on the navigation surface 104.

The optical navigation circuit 116 includes an image acquisition system 122, a digital signal processor (DSP) 124, and a driver 126. In one embodiment, the driver of the optical navigation circuit controls the operation of the illumination system 110 (e.g., using a driver signal or driver signals) to generate the light beam 106 that is incident on the navigation surface 104. The light beam that is incident on the navigation surface is reflected from the navigation surface and a portion of the reflected light 108 passes through optical element 118 and is detected by the image acquisition system 122.

The image acquisition system 122 includes an image sensor 128 and an analog-to-digital converter (ADC) 130. The image sensor includes an array of pixels 132 with each pixel being a distinct photosensor or other photosensitive device. An exemplary image sensor includes an 30×30 pixel array with each pixel measuring approximately 50 um×50 um. In an embodiment, the image sensor is a complementary metal oxide semiconductor (CMOS) sensor. The image sensor generates output signals corresponding to the incident light at each pixel of the pixel array and provides the output signals to the analog-to-digital converter. The analog-to-digital converter converts the output signals from analog signals to digital signals and then passes the converted digital signals to the digital signal processor 124 as, for example, digital image information, referred to herein as the image data or the image sensor output. In an embodiment, the image sensor captures frames of image data at a rate of 800-8,000 frames per second.

After the digital signal processor 124 receives the image data from the analog-to-digital converter 130, the digital signal processor performs additional processing using the image data. For example, the digital signal processor cross-correlates successive frames of image data to determine relative movement between the optical navigation device 102 and the navigation surface 104. The digital signal processor then transmits one or more signals, which represent the relative movement, to the microcontroller 120. Descriptions of exemplary optical navigation tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein.

An optical navigation device such as the optical navigation device 102 depicted in FIG. 1 can be used directly on an opaque surface such as a desktop or on a transparent structure, such as a glass plate, which overlays a desktop. Some problems associated with navigation on a transparent structure are described with reference to FIGS. 2A and 2B.

Figure 2A:
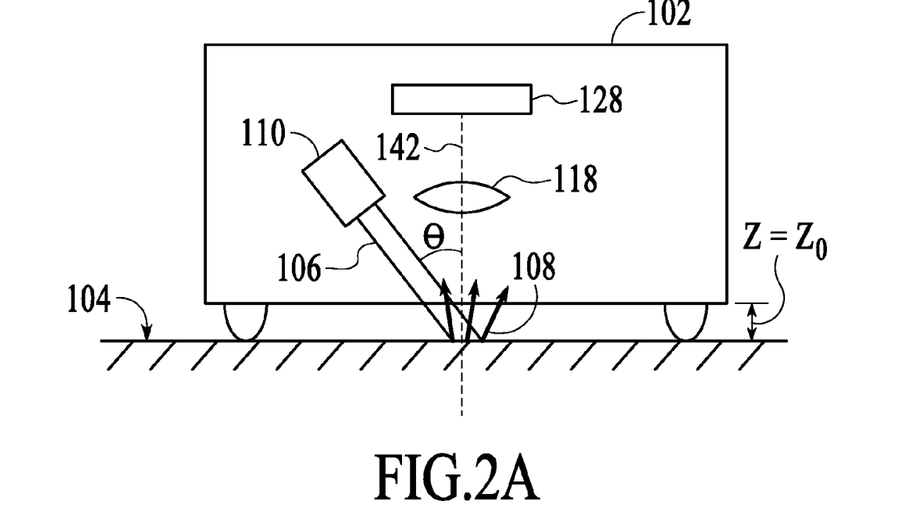
FIG. 2A illustrates an optical navigation device that is used directly on an opaque surface such as a desktop.

FIG. 2A illustrates an optical navigation device 102 that is used directly on an opaque surface 140 such as a desktop. In FIG. 2A, the optical navigation device is separated from the opaque surface by a separation distance, z, where $z=z_0$ and the illumination source 110 is configured relative to the lens 118 and the image sensor 128 so that a relatively large portion of light 108 reflected from the opaque surface is captured by the image sensor. The detected light produces an image sensor output with a relatively strong signal. In FIG. 2A, the angle of incidence, $\theta$, of the light beam 106, relative to an optical axis 142 that is aligned with the center of the image sensor and the center of lens 118, is such that a high concentration of reflected light is directed towards the image sensor.

Figure 2B:
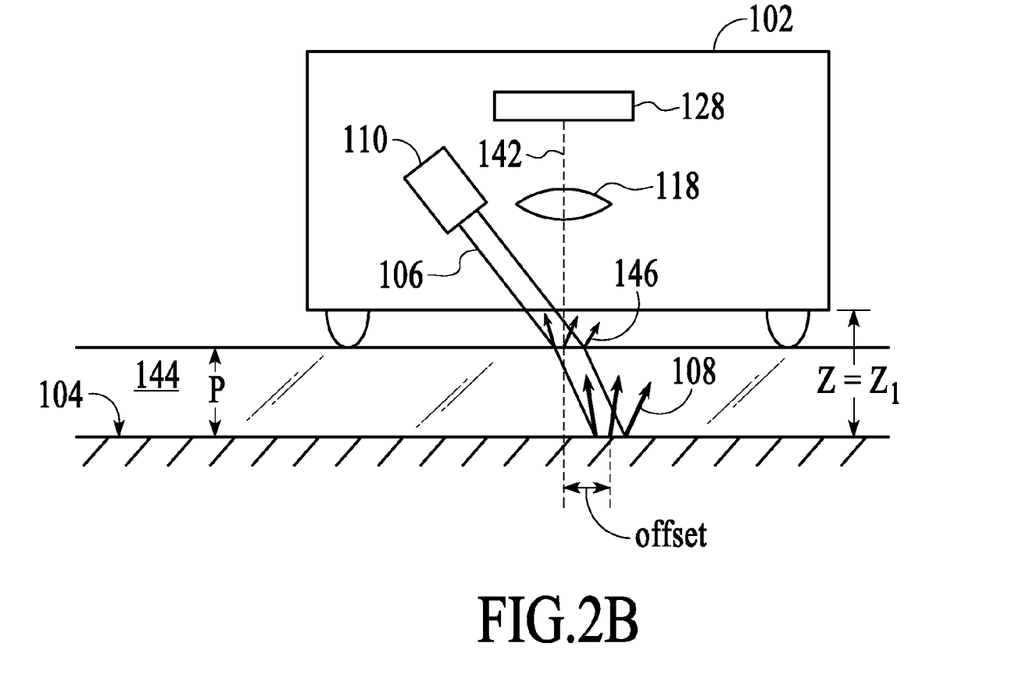
FIG. 2B illustrates the optical navigation device of FIG. 2A being used on a transparent surface such as a glass plate, which overlays an opaque surface such as a desktop instead of directly on the opaque surface.

FIG. 2B illustrates the optical navigation device 102 of FIG. 2A being used on a transparent structure 144 such as a glass plate, which overlays an opaque surface 140 such as a desktop instead of directly on the opaque surface. In FIG. 2B, the glass plate has a thickness, p, and the separation distance, z, between the optical navigation device and the opaque surface is identified as $z=z_1$, where $z_0<z_1$. In the example of FIG. 2B, the optical navigation device is still configured to optimally operate at a separation distance of $z=z_0$. However, because of the non-zero angle of incidence of the light beam 106 relative to the optical axis 142 and because of the thickness of the glass plate 144, the location of the illuminated spot on the opaque surface 140 is shifted laterally relative to the illuminated spot in FIG. 2A. While a majority of the light passes through the glass plate and reflects off the opaque surface, a lesser amount of light 146 may reflect off the top surface of the glass plate. For relatively small offsets (e.g., relatively thin glass plates), the amount of detected light that is reflected from the opaque surface is large relative to the amount of detected light that is reflected from the top surface of the glass plate. When the amount of detected light that is reflected from the opaque surface is large relative to the amount of detected light that is reflected from the top surface of the glass plate, it is desirable to perform navigation tracking using image information obtained from the detected light that is reflected from the opaque surface. However, as the separation distance, z, increases, for example as the result of a thicker glass plate, the amount of detected light that is reflected from the top surface of the glass plate may become larger than the amount of detected light that is reflected from the opaque surface. In this case, it may be desirable to perform navigation tracking using image information obtained from detected light that is reflected from the top surface of the glass plate instead of from image information obtained from detected light that is reflected from the opaque surface.

Figure 3A:
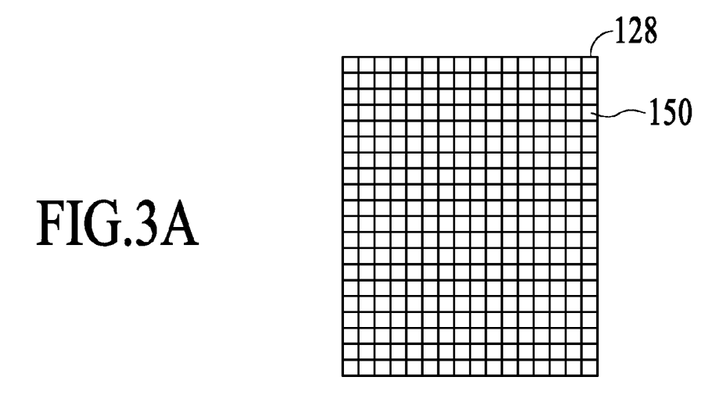
FIG. 3A depicts an image sensor, such as the image sensor from FIGS. 1, 2A, and 2B, which includes an array of pixels with each pixel being a distinct photosensor element that generates a distinct output signal representative of the intensity of the received light.
Figure 3B:
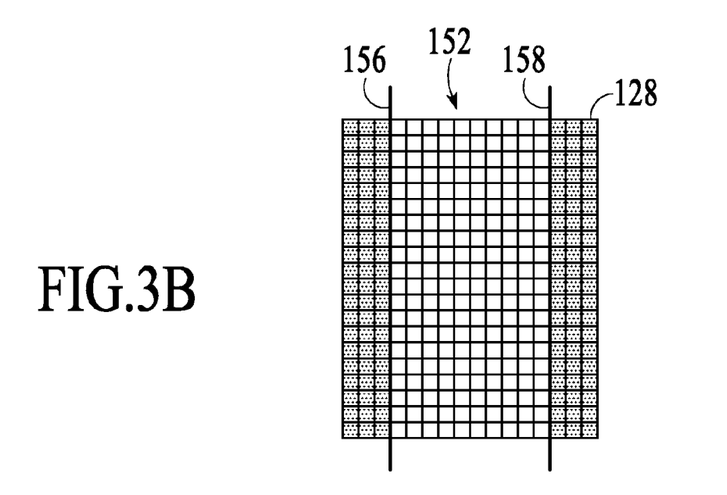
FIG. 3B illustrates a navigation window that has been established by de-activating columns of pixels on the left and right sides of the navigation sensor from FIG. 3A.
Figure 3C:
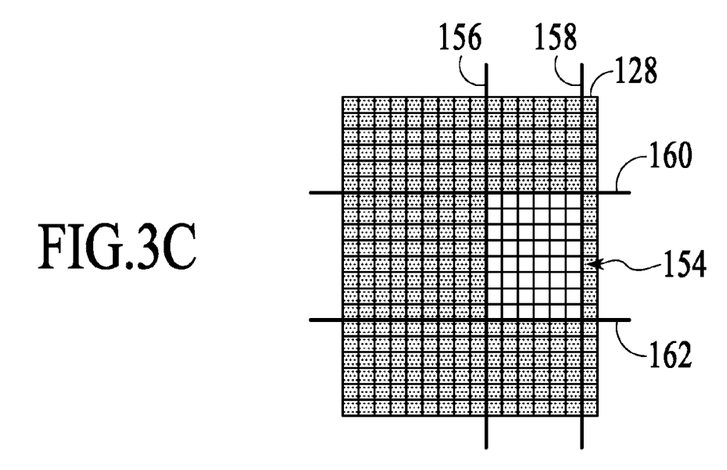
FIG. 3C illustrates a navigation window that has been established by de-activating columns and rows of pixels on the navigation sensor from FIG. 3A.

In an embodiment, a navigation window is defined by a set of pixels in an image sensor that is used by an optical navigation circuit to generate movement information. That is, the set of pixels, which produce output signals that are used for image correlation, defines the navigation window. A characteristic of the navigation window can be changed by changing the activation state of pixels in the image sensor. As is described in more detail below, the activation state of pixels can be changed to change the position, the size, and/or the shape of the navigation window to optimize the output from the image sensor. FIG. 3A depicts an image sensor 128, such as the image sensor from FIGS. 1, 2A, and 2B, which includes an array of pixels with each pixel 150 being a distinct photosensor element that generates a distinct output signal representative of the intensity of the received light. In an embodiment, pixels can be activated so that they are included in the navigation window or de-activated so that they are not included in the navigation window. In an embodiment, pixels can be selectively activated/de-activated via a software interface. In FIG. 3A, all of the pixels are activated so that the navigation window includes all of the pixels. Some pixels of the image sensor can be de-activated to change a characteristic (e.g., position, size, shape) of the navigation window. FIG. 3B illustrates a navigation window 152 that has been established by de-activating columns of pixels on the left and right sides of the navigation sensor. In particular, pixels to the left of line 156 and to the right of line 158 are de-activated. FIG. 3C illustrates a navigation window that has been established by de-activating columns and rows of pixels on the navigation sensor. In particular, pixels to the left of line 156, to the right of line 158, above line 160, and below line 162 are de-activated.

In accordance with an embodiment of the invention, an optical navigation device can be adapted for navigation on a glass plate by establishing a navigation window for navigation tracking, detecting reflected light within the navigation window, generating an output signal in response to the detected light, and adjusting a characteristic of the navigation window in response to the output signal. In an embodiment, a characteristic of the navigation window is adjusted to optimize the image sensor output for navigation tracking. For example, in the case where the amount of detected light that is reflected from the opaque surface is greater than the amount of detected light that is reflected from the top surface of the glass plate, a characteristic of the navigation window is adjusted to primarily detect light that is reflected from the opaque surface. Likewise, in the case where the amount of detected light that is reflected from the top surface of the glass plate is greater than the amount of detected light that is reflected from the opaque surface (e.g., because of the thickness of the glass plate), a characteristic of the navigation window is adjusted to primarily detect light that is reflected from the top surface of the glass plate.

Figure 4A:
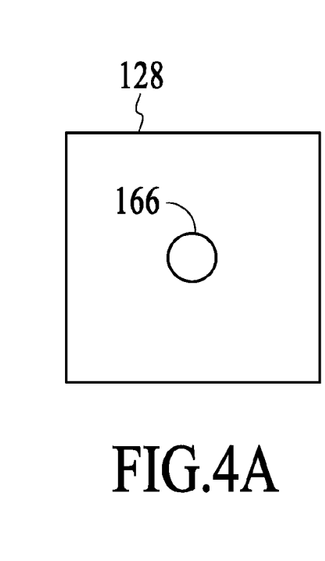
FIG. 4A illustrates a spot of reflected light on an image sensor in the case where the optical navigation device sits directly on an opaque surface as illustrated in FIG. 2A.

An example of how a characteristic of the navigation window can be adjusted to adapt an optical navigation device for navigation tracking on a glass plate is now described with reference to FIGS. 4A-4D. FIG. 4A illustrates a spot 166 of reflected light on an image sensor 128 in the case where the optical navigation device sits directly on an opaque surface as illustrated in FIG. 2A (e.g., where $z=z_0$). In this case, a relatively large amount of reflected light is detected by the image sensor in a concentrated spot, thereby producing strong output signals from the image sensor. In this case, the navigation window can be left in a default state in which, for example, all of the pixels of the image sensor are active.

Figure 4B:
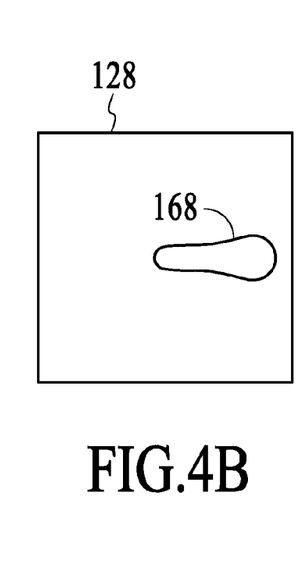
FIGS. 4B-4D illustrate different examples of detected light on the image sensor as the separation distance, z, increases as a result of glass plates of increasing thickness.
Figure 4C:
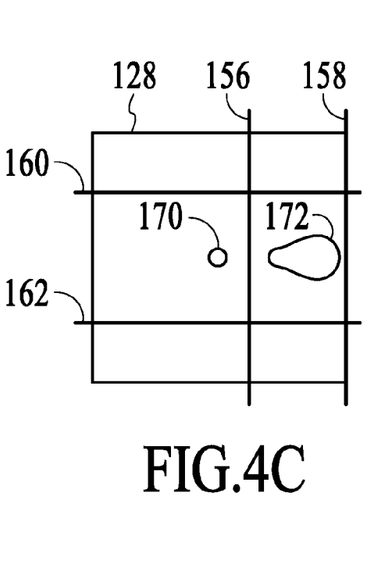
Figure 4D:
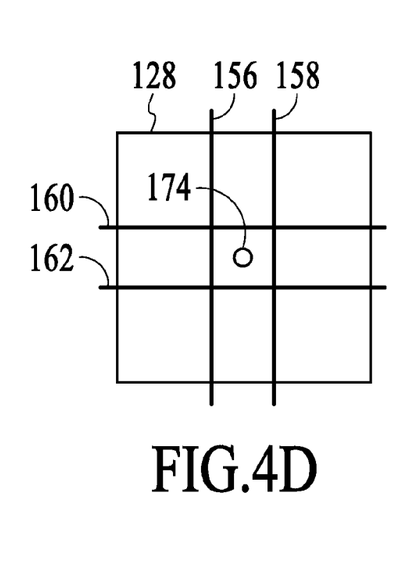

FIGS. 4B-4D illustrate different examples of detected light on the image sensor 128 as the separation distance, z, increases from $z=z_0$ to $z=z_3$, where $z_0<z_1<z_2<z_3$, as a result of glass plates of increasing thickness. FIG. 4B illustrates a spot 168 of detected light that results from a glass plate thickness that sets the separation distance at $z=z_1$. The spot of detected light includes a mix of light that is reflected from the top surface of the glass plate and light that is reflected from the opaque surface. In this case, the image information from all of the pixels in the image sensor is satisfactory for navigation tracking and therefore the navigation window is not adjusted. Although the navigation window is not adjusted in this example, in another embodiment the navigation window may be adjusted.

FIG. 4C illustrates reflected light that results from a glass plate thickness that sets the separation distance at $z=z_2$. The detected light in this case includes a relatively weak spot 170 of light that is reflected from the top surface of the glass plate and a relatively strong spot 172 of light that is reflected from the opaque surface. In this case, the position and size of the navigation window are adjusted to detect reflected light primarily from the opaque surface. The navigation window is adjusted in this manner to isolate the relatively strong spot of light that is reflected from the opaque surface and to reduce the amount of interference that is contributed from the relatively weak light that is reflected from the top surface of the glass plate. At some point, if the glass plate is too thick, the amount of detected light that is reflected from the glass plate will be relatively large compared to the amount of detected light that is reflected from the opaque surface. In this case, the navigation window is adjusted to detect reflected light primarily from the top surface of the glass plate. FIG. 4D illustrates the case in which the glass plate is so thick that the amount of detected light that is reflected from the top surface of the glass plate, spot 174, is relatively large compared to the amount of detected light that is reflected from the opaque surface. As illustrated in FIG. 4D, the navigation window has been adjusted to detect reflected light primarily from the surface of the glass plate. In this case, adjusting the navigation window to detect reflected light primarily from the surface of the glass plate reduces interference from light that is reflected from the opaque surface.

In an embodiment, the navigation window is adjusted to optimize navigation tracking. Typically, optimal navigation tracking is achieved when image correlation is performed on image information that has the most distinguishable image features. In an embodiment, the characteristics of the navigation window that produce the most distinguishable image features are determined in response to the image sensor output. For example, the image sensor output is monitored and the navigation window is adjusted until an acceptable image sensor output is achieved.

Figure 5:
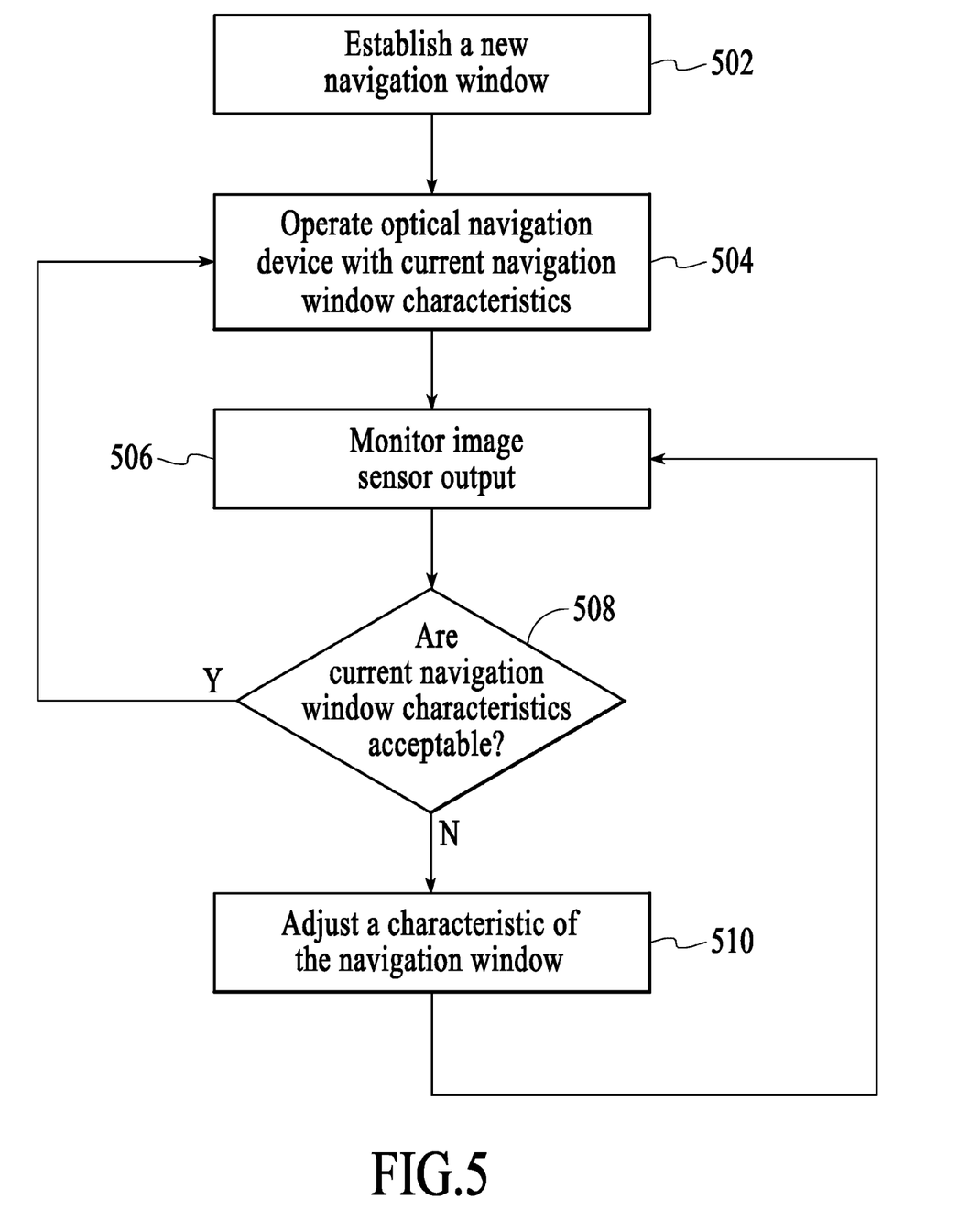
FIG. 5 depicts a process flow diagram of a method for adapting an optical navigation device for navigation on a transparent structure that overlays an opaque structure.

FIG. 5 depicts a process flow diagram of a method for adapting an optical navigation device for navigation on a transparent structure that overlays an opaque structure. At block 502, a navigation window is established. For example, the navigation window is set at an initial default setting that includes all of the image sensor pixels activated. At block 504, the optical navigation device is operated with the current navigation window characteristics. At block 506, the image sensor output is monitored. In an embodiment, the image sensor output is monitored by observing the shutter time of the pixels or by monitoring the quality of the image data. At decision point 508, it is determined whether or not the current navigation window characteristics are acceptable. If the current navigation window characteristics are acceptable, then the process returns to block 504 where the optical navigation device continues to be operated with the current navigation window characteristics. If the current navigation window characteristics are not acceptable, then at block 510 a characteristic of the navigation window is adjusted. For example, the position, size, and/or shape of the navigation window is adjusted by activating/de-activating image sensor pixels. After a characteristic of the navigation window is adjusted, the process returns to block 506, where the image sensor output is monitored. The process of adjusting a characteristic of the navigation window and monitoring the image sensor output continues until acceptable navigation window characteristics are established.

Figure 6:
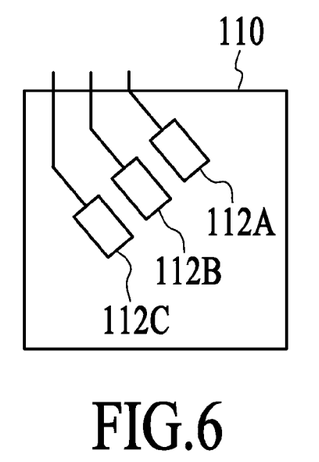
FIG. 6 depicts an illumination system that includes multiple individually controllable light sources.

As described above, a characteristic of the navigation window is adjusted to adapt the optical navigation device for navigation on a glass plate that overlays an opaque surface. In addition to adjusting a characteristic of the navigation window, an optical navigation device may be adapted for navigation on a glass plate by adjusting an illumination characteristic of the optical navigation device. For example, some aspect of the illumination system can be adjusted to change a characteristic of the light beam, which in turn changes a characteristic of the reflected light that is detected by the image sensor. In an embodiment, the illumination system includes multiple light sources that can be individually controlled to change a characteristic of the light beam. FIG. 6 depicts an illumination system 110 that includes multiple individually controllable light sources 112A-112C, such as multiple individually controllable lasers. In an embodiment, the light sources are configured so that the position, size, shape, and or intensity distribution of the resulting combined light beam can be changed to change the position, size, shape, and/or intensity of the illumination on the surface of the glass plate and/or on the top surface of the opaque surface.

Figure 7A:
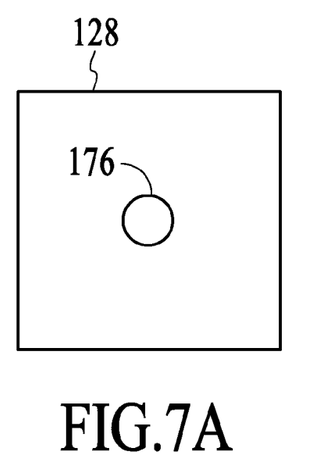
FIGS. 7A-7C illustrate an example of adjusting an illumination characteristic to adapt an optical navigation device for navigation tracking on a glass plate.

An example of how an illumination characteristic can be adjusted to adapt an optical navigation device for navigation tracking on a glass plate is now described with reference to FIGS. 7A-7C. FIG. 7A illustrates a spot 176 of reflected light on an image sensor 128 in the case where the optical navigation device sits directly on an opaque surface as illustrated in FIG. 2A (e.g., where $z=z_0$). In this case, the spot is concentrated into a relatively tight spot and a relatively strong image sensor output is produced.

Figure 7B:
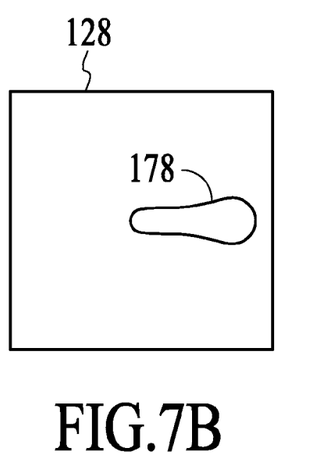
Figure 7C:
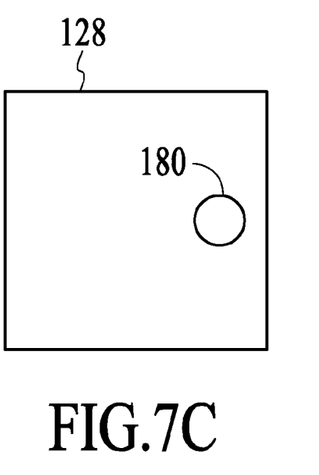

FIG. 7B illustrates a spot 178 of reflected light that results when a glass plate that sets the separation distance at $z=z_1$ sits between the optical navigation device and the opaque surface. In this case, the spot is more widely scattered than the spot in FIG. 7A and may include reflected light from the opaque surface and reflected light from the top surface of the glass plate. In accordance with an embodiment of the invention, an illumination characteristic is adjusted to change a characteristic of the illumination spot. FIG. 7C illustrates a spot 180 of reflected light that results after an illumination characteristic is adjusted. In this case, the illumination is adjusted to increase the intensity of the reflected light from the opaque surface and to reduce the amount of detected light that is reflected from the top surface of the glass plate. In one embodiment, the adjustment involves driving a different combination of the light sources at different intensity levels.

Figure 8:
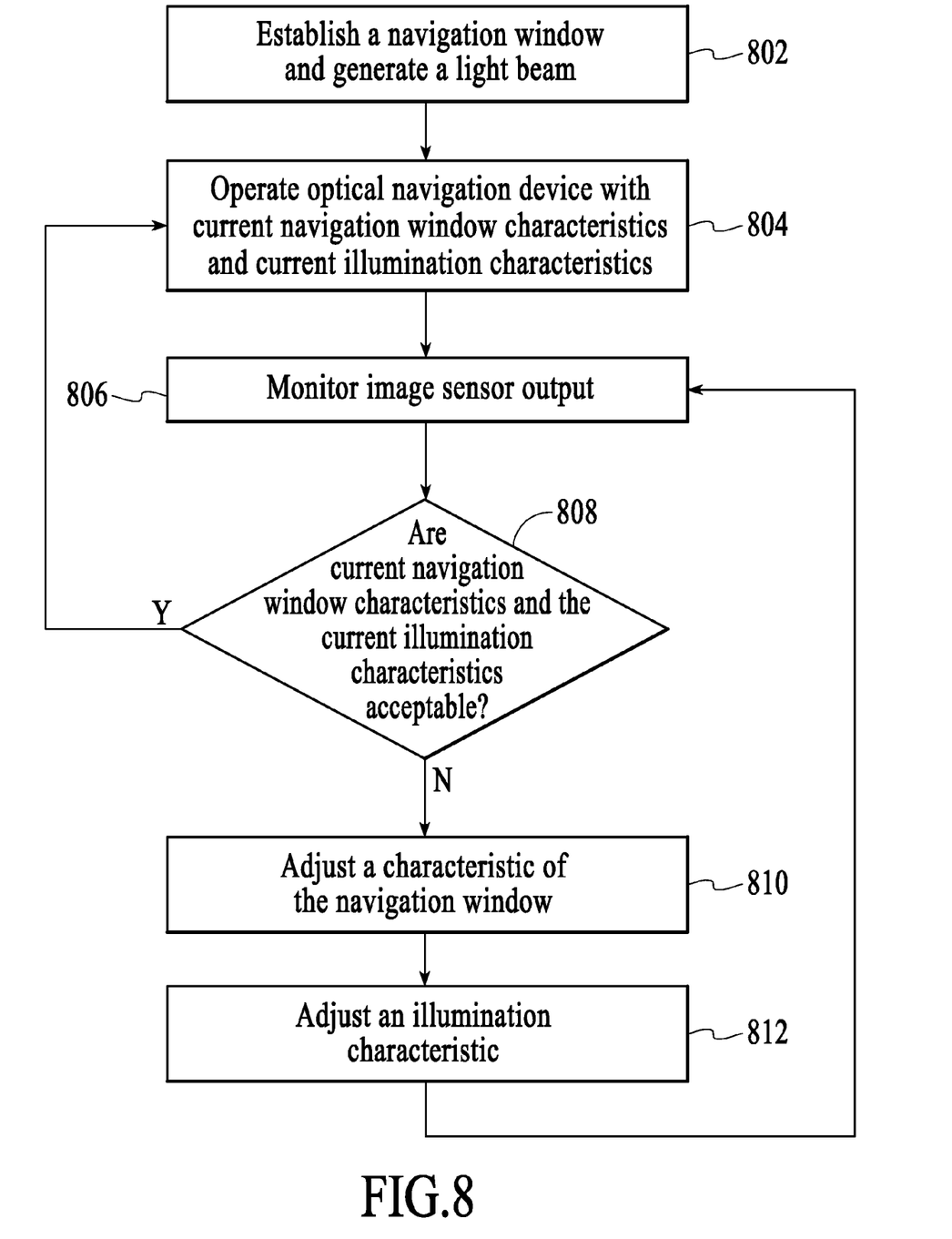
FIG. 8 depicts a process flow diagram of another method for adapting an optical navigation device for navigation on a transparent structure that overlays an opaque structure.

FIG. 8 depicts a process flow diagram of another method for adapting an optical navigation device for navigation on a transparent structure that overlays an opaque structure. This method is similar to the method of FIG. 5 except that the method includes adjusting an illumination characteristic in addition to adjusting the navigation window. At block 802, a navigation window is established and a light beam is generated. At block 804, the optical navigation device is operated with the current navigation window characteristics and the current illumination characteristics. At block 806, the image sensor output is monitored. At decision point 808, it is determined whether or not the current navigation window characteristics and the current illumination characteristics are acceptable. If the current navigation window characteristics and the current illumination characteristics are acceptable, then the process returns to block 804 where the optical navigation device continues to be operated with the current navigation window characteristics and the current illumination characteristics. If the current navigation window characteristics and the current illumination characteristics are not acceptable, then at block 810 a characteristic of the navigation window is adjusted and at block 812 an illumination characteristic is adjusted. For example, the position, size, and/or shape of the navigation window is adjusted by activating/de-activating image sensor pixels and the light beam is changed by driving a different combination of the light sources. After a characteristic of the navigation window and an illumination characteristic are adjusted, the process returns to block 806, where the image sensor output is monitored. In an alternative embodiment, either a characteristic of the navigation window or an illumination characteristic is adjusted in one iteration of the process, but not both. That is, a first iteration may involve only an adjustment of the navigation window and a second iteration may involve only an adjustment of the illumination system.

Figure 9:
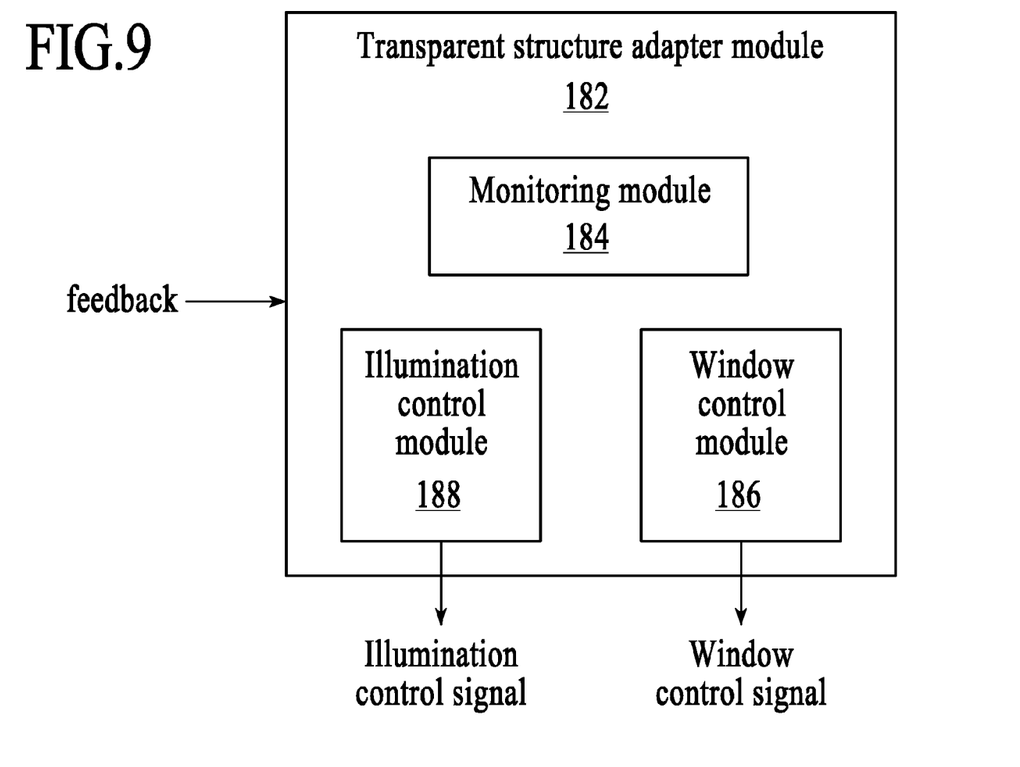
FIG. 9 depicts a transparent structure adaptor module that may be incorporated into the optical navigation circuit from FIG. 1.

FIG. 9 depicts a transparent structure adaptor module 182 that may be incorporated into the optical navigation circuit 116 of the optical navigation device 102 of FIG. 1. The transparent structure adaptor module includes a monitoring module 184, a window control module 186, and an illumination control module 188. The monitoring module performs the above-described monitoring function. For example, the monitoring module monitors feedback from the image sensor 128 to determine if the current image sensor output is acceptable for navigation tracking. The window control and illumination control modules make navigation window control and illumination control decisions in response to the monitoring module. For example, the window control module generates a window control signal that is used to adjust a characteristic of the navigation window and the illumination control module generates an illumination control signal that is used to adjust an illumination characteristic.

Figure 10:
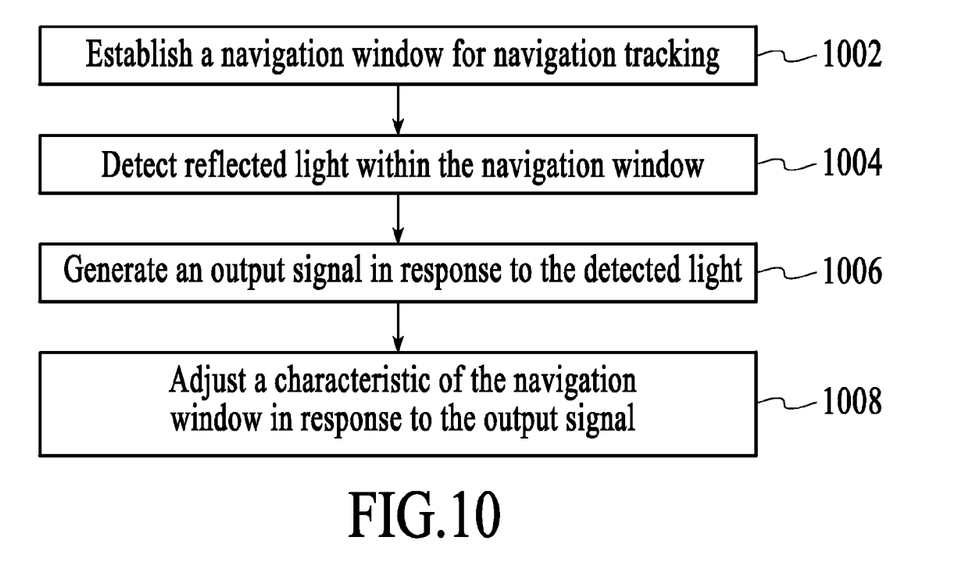
FIG. 10 is a process flow diagram of a method for adapting an optical navigation device for navigation on a transparent structure where the transparent structure overlays an opaque surface.

FIG. 10 is a process flow diagram of a method for adapting an optical navigation device for navigation on a transparent structure where the transparent structure overlays an opaque surface. At block 1002, a navigation window is established for navigation tracking. At block 1004, reflected light is detected within the navigation window. At block 1006, an output signal is generated in response to the detected light. At block 1008, a characteristic of the navigation window is adjusted in response to the output signal.

The above described techniques are described for a situation where a glass plate overlays a desktop. It should be noted that the same techniques for adapting an optical navigation device to operate on a transparent structure can be employed when the optical navigation device is used on a transparent structure that does not overlay an opaque surface, for example, a glass table. In this case, light which is reflected from the top surface of the glass table will likely be the only light that produces any usable image data so a characteristic of the navigation window and/or an illumination characteristic are adjusted to optimize the image sensor output in response to the reflected light from the top surface of the glass table.

Although some examples of navigation window positions, sizes, and shapes are described above, it should be noted that various different positions, sizes, and shapes of the navigation window are possible. For example, any combination of position, size, and shape that produces acceptable image data can be used. In an embodiment, the position, size, and shape of the navigation window is selected to produce an improvement in the image data and in another embodiment, the position, size, and shape of the navigation window is selected to produce the optimal image data.

Although position, size, and shape are described as examples of characteristics of a navigation window that can be adjusted to adapt an optical navigation device for use on a transparent structure, other characteristics of a navigation window can be adjusted to adapt an optical navigation device for use on a transparent structure. In one example, a characteristic of the navigation window can be adjusted by adjusting the sensitivity of some or all of the pixels. In another example, a characteristic of the navigation window can be adjusted by blocking a portion of the reflected light, redirecting reflected light, or otherwise manipulating light form the illumination system before and/or after the light is reflected.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for adapting an optical navigation device for navigation on a transparent structure where the transparent structure overlays an opaque surface, the method comprising:
   establishing a navigation window for navigation tracking;
   detecting reflected light within the navigation window;
   generating an output signal in response to the detected light; and
   adjusting a characteristic of the navigation window in response to the output signal, wherein adjusting a characteristic of the navigation window comprises:
   adjusting a characteristic of the navigation window to primarily detect light that is reflected from the opaque surface when the amount of detected light that is reflected from the opaque surface is greater than the amount of detected light that is reflected from a top surface of the transparent structure; and
   adjusting a characteristic of the navigation window to primarily detect light that is reflected from the top surface of the transparent structure when the amount of detected light that is reflected from the top surface of the transparent structure is greater than the amount of detected light that is reflected from the opaque surface.

2. The method of claim 1 wherein the navigation window is adjusted to optimize the output signal.

3. The method of claim 1 wherein adjusting a characteristic of the navigation window comprises changing the position of the navigation window.

4. The method of claim 2 wherein changing the position of the navigation window comprises changing the activation state of pixels in an image sensor of the optical navigation device.

5. The method of claim 1 wherein adjusting a characteristic of the navigation window comprises changing the size of the navigation window.

6. The method of claim 4 wherein changing the size of the navigation window comprises changing the activation state of pixels in an image sensor of the optical navigation device.

7. The method of claim 1 wherein adjusting a characteristic of the navigation window comprises changing the shape of the navigation window.

8. The method of claim 1 further comprising adjusting an illumination characteristic of the optical navigation device when the distance between the optical navigation device and the opaque surface changes from a first distance.

9. The method of claim 8 wherein adjusting an illumination characteristic comprises changing a characteristic of an illumination spot.

10. The method of claim 1 wherein the navigation window comprises a set of pixels in an image sensor which captures image data that is cross-correlated to generate movement information.

11. The method of claim 10 wherein adjusting a characteristic of the navigation window comprises changing the activation state of pixels in the image sensor of the optical navigation device.

12. A method for adapting an optical navigation device for navigation on a transparent structure where the transparent structure overlays an opaque surface, the method comprising:
    establishing a navigation window;
    outputting light towards the transparent structure and the opaque surface;
    detecting reflected light within the navigation window; and
    adjusting a characteristic of the navigation window in response to the detected light to select whether the navigation window detects reflected light primarily from a surface of the transparent structure or primarily from the opaque surface.

13. The method of claim 12 wherein the navigation window comprises a set of pixels in an image sensor which captures image data that is cross-correlated to generate movement information.

14. The method of claim 13 wherein adjusting a characteristic of the navigation window comprises changing the activation state of pixels in the image sensor.

15. The method of claim 14 wherein adjusting a characteristic of the navigation window comprises changing the size of the navigation window.

16. The method of claim 14 wherein adjusting a characteristic of the navigation window comprises changing the position of the navigation window.

17. The method of claim 11 wherein a characteristic of the navigation window is changed to optimize signal strength from an image sensor of the optical navigation device.

18. The method of claim 11 wherein a characteristic of the navigation window is changed to align the navigation window with reflected light primarily from the illuminated spot on the opaque surface.

19. An optical navigation device comprising:
    an illumination system configured to output light;
    an image sensor configured to generate an output signal related to a detected portion of the light; and a transparent structure adaptor module configured to adjust a navigation window of the image sensor in response to the output signal to adapt the optical navigation device for use directly on an opaque surface or for use on a transparent structure that is located between the optical navigation device and the opaque surface, wherein the transparent structure adaptor module comprises a window control module configured to adjust a characteristic of the navigation window in response to feedback from the image sensor, wherein adjusting a characteristic of the navigation window comprises:

adjusting a characteristic of the navigation window to primarily detect light that is reflected from the opaque surface when the amount of detected light that is reflected from the opaque surface is greater than the amount of detected light that is reflected from a top surface of the transparent structure; and adjusting a characteristic of the navigation window to primarily detect light that is reflected from the top surface of the transparent structure when the amount of detected light that is reflected from the top surface of the transparent structure is greater than the amount of detected light that is reflected from the opaque surface.

20. The optical navigation device of claim 19 wherein a characteristic of the navigation window is adjusted by changing the activation state of pixels in the image sensor.

21. The optical navigation device of claim 19 wherein the transparent structure adaptor module comprises an illumination control module configured to adjust the illumination of the opaque surface in response to the feedback from the image sensor.

* * * * *